US009512570B2

(12) United States Patent
Vast et al.

(10) Patent No.: US 9,512,570 B2
(45) Date of Patent: Dec. 6, 2016

(54) SHEET HAVING A TACTILE EFFECT AND AN INTERFERENTIAL EFFECT AND SECURITY DOCUMENT COMPRISING THE SAME

(75) Inventors: Nathalie Vast, Mont Saint Eloi (FR); Sébastien Charignon, Saint Ondras (FR)

(73) Assignee: ARJOWIGGINS SECURITY, Issy les Moulineaux (FR)

( * ) Notice: Subject to any disclaimer, the term of this patent is extended or adjusted under 35 U.S.C. 154(b) by 1316 days.

(21) Appl. No.: 12/444,926

(22) PCT Filed: Oct. 31, 2007

(86) PCT No.: PCT/FR2007/052291

§ 371 (c)(1), (2), (4) Date: Jun. 10, 2009

(87) PCT Pub. No.: WO2008/053130

PCT Pub. Date: May 8, 2008

(65) Prior Publication Data

US 2010/0002303 A1 Jan. 7, 2010

(30) Foreign Application Priority Data

Oct. 31, 2006 (FR) ..................................... 06 09551

(51) Int. Cl.

| | |
|---|---|
| ***G02B 5/18*** | (2006.01) |
| ***G02B 27/42*** | (2006.01) |
| ***D21H 21/40*** | (2006.01) |
| ***B42D 25/29*** | (2014.01) |
| *D21H 21/44* | (2006.01) |

(52) U.S. Cl.

CPC .............. *D21H 21/40* (2013.01); *B42D 25/29* (2014.10); *D21H 21/44* (2013.01)

(58) Field of Classification Search

CPC ............................ G03H 1/0011; B42D 25/328
USPC ......................... 359/558, 2; 235/491; 283/86
See application file for complete search history.

(56) References Cited

U.S. PATENT DOCUMENTS 5,837,333 A * 11/1998 Nagayama et al. ............ 428/15
6,656,319 B1 * 12/2003 Boyd et al. .................. 156/305
6,917,400 B2 * 7/2005 Nakamura et al. ............ 349/96
7,224,528 B2 * 5/2007 Phillips et al. ............... 359/584
(Continued)

FOREIGN PATENT DOCUMENTS

EP 0 490 825 A1 6/1992
JP A-2005-85094 3/2005
(Continued)

OTHER PUBLICATIONS

"4 Description and Assessment of Features." Currency Features for Visually Impaired People. Washington, DC: The National Academies Press, 1995.*

*Primary Examiner* — Bumsuk Won
*Assistant Examiner* — Tamara Y Washington
(74) *Attorney, Agent, or Firm* — Oliff PLC

(57) ABSTRACT

A sheet including a substrate and a security device including at least one area having an interferential effect. The security device further includes at least one tactile recognition member provided in the same region as the area having an interferential effect. A security document and an article to be authenticated including the sheet are also provided.

47 Claims, 1 Drawing Sheet

(56) References Cited

U.S. PATENT DOCUMENTS

Figure 1:
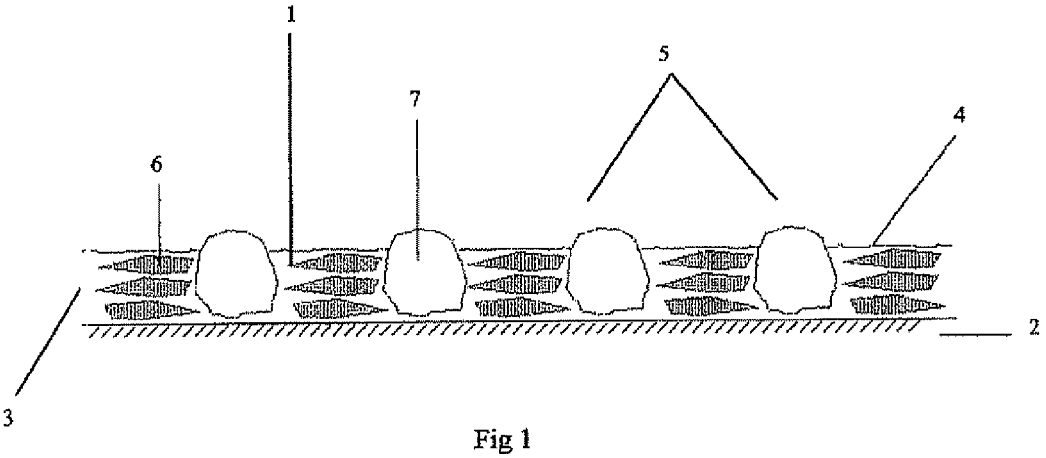

| | | | | |
|---|---|---|---|---|
| 8,164,810 | B2 * | 4/2012 | Phillips et al. | 359/2 |
| 2007/0121181 | A1 * | 5/2007 | Moon et al. | 359/2 |
| 2008/0107875 | A1 * | 5/2008 | Rosset et al. | 428/197 |

FOREIGN PATENT DOCUMENTS

| | | | |
|---|---|---|---|
| WO | WO 91/12146 | A2 | 8/1991 |
| WO | WO 01/60924 | A2 | 8/2001 |
| WO | WO 03/097376 | A1 | 11/2003 |
| WO | WO 2004/030928 | A1 | 4/2004 |
| WO | WO 2004030928 | A1 * | 4/2004 |
| WO | WO 2006/016088 | A1 | 2/2006 |

* cited by examiner

SHEET HAVING A TACTILE EFFECT AND AN INTERFERENTIAL EFFECT AND SECURITY DOCUMENT COMPRISING THE SAME

The invention relates to a sheet containing a security means and an article incorporating such a sheet.

Substances having an interference effect, especially iridescent substances, are widely used as security elements in the security document industry. This is because the substances having an interference effect have the ability to change hue depending on the angle of observation and/or of illumination. In particular, iridescent substances of pale color, in particular that are not very visible at certain angles, are used. These are particularly difficult to copy by possible counterfeiters, their varying optical effect not being able to be reproduced by photocopying or with a scanner.

Nevertheless, such substances having an interference effect, in particular those of a pale color, have a drawback in that they do not always attract the attention of the users who handle them. Hence, the man on the street, not having his attention drawn by this security element, risks forgetting to verify its presence. The attention of the user is drawn even less when the eyesight of the latter is poor. Furthermore, since the proportion of the older, therefore having poorer eyesight, population is increasing, it is therefore becoming increasingly necessary to provide security elements that can be easily spotted by people who can see but who have vision defects.

On the other hand, in view of the ever increasing rise in counterfeiting and in the means that are available to the counterfeiters, there is a constant need to improve the security devices of security documents.

A security paper is known from Application EP 0 490 825 that has, at its surface, several iridescent zones of which at least one is almost invisible by direct observation and is colored at an oblique angle of observation. In order to obtain a better perception of the color change, it is proposed that at least two regions of the iridescent coating, preferably neighboring regions, are of different colors, the contrast between the colors supposedly enabling better detection.

However, this arrangement has a drawback since the various colors chosen for the iridescent coating are not very perceptible at direct observation so that the uninformed user, not perceiving the presence of the iridescent coating by direct observation (in front of him), may forget to verify the presence of the latter by oblique observation in order to authenticate the paper.

One objective of the invention is therefore to produce a sheet comprising a security element having an interference effect for which the security properties are further improved.

Another objective of the invention is to produce a security document or article with a security element having an interference effect, in particular a pale iridescent coating, which attracts the attention of the man on the street who wishes to authenticate said document.

These various objectives are achieved by providing a sheet comprising a support and a security means comprising at least one zone having an interference effect, characterized in that said security means also comprises at least one tactile recognition element located in the same region as said zone having an interference effect.

Thus, the invention has the advantage that the tactile recognition element makes it possible to attract the attention of the user of the sheet to the region bearing said tactile recognition element, and thus to lead the user to verify the presence of the zone having an interference effect.

Another advantage of the invention is to combine, in a single region, the protection provided by the presence of an element having an interference effect with that provided by a tactile recognition element and thus to strengthen the level of security of the sheet.

According to one embodiment of the invention, the portion of the sheet containing the tactile recognition element and the portion of the sheet containing the zone having an interference effect completely overlap.

In another embodiment, the portion of the sheet containing the tactile recognition element and the portion of the sheet containing the zone having an interference effect partially overlap.

According to another embodiment of the invention, the tactile recognition element surrounds and delimits the zone having an interference effect.

According to another embodiment of the invention, the zone having an interference effect surrounds and delimits the tactile recognition element.

According to one embodiment of the invention, said tactile recognition element is located at the surface of said zone having an interference effect and/or at least partially incorporated into the bulk of said zone having an interference effect and/or is at the surface of said support and/or at least partially incorporated into the bulk of said support for the sheet. For example, the tactile recognition element is incorporated into the support for the sheet in the region where the zone having an interference effect is located.

According to one embodiment of the invention, the security means and/or the zone having an interference effect is a continuous strip such as, for example, the iridescent strips customarily deposited at the surface of bank notes, such as euro notes, which have a given width and generally extend from one edge to the other of the note.

More particularly, the strip has a width between 0.5 and 4 cm, preferably between 0.5 and 2.5 cm.

According to another embodiment of the invention, the security means and/or the zone having an interference effect forms at least one pattern, in particular an alphanumeric character and/or a design and/or a symbol.

According to another embodiment of the invention, the security means and/or the zone having an interference effect, in particular in the form of an iridescent strip, has missing material that gives the interference and/or tactile effect, these gaps thus appearing as negative on the support. Said gaps may form patterns, in particular an alphanumeric character and/or a design and/or a symbol.

According to one embodiment of the invention, the security means represents at least one pattern having a fine structure. Such a configuration, by the alternation over a small distance of zones having a tactile effect and of zones lacking a tactile effect, has the advantage of reinforcing the perception of the tactile effect of the security means. For example, it may be continuous or non-continuous spaced-apart lines, or else a spiral having several turns. Thus, according to one particular example of the invention, the security means has the shape of a square spiral inscribed in a square having sides of 8 mm, the width of one turn being less than 0.4 mm and two contiguous turns being spaced around 0.9 mm apart.

Preferably, in order to further reinforce the perception of the tactile effect, the sheet comprises several patterns that have a fine (embossed) structure and that follow one another.

According to one particular case, the patterns all have the same interference effect, therefore the same variation in colors depending on the angle of observation and/or of illumination.

According to another particular case, the patterns have different interference effects. Thus, for example, the security means may be composed of several alphanumeric characters and symbols having various color variations so as to reproduce a logo.

According to another embodiment, the patterns may form a code, in particular that can be read by a machine.

According to one embodiment of the invention, the sheet has several patterns located in-register relative to said sheet.

According to one embodiment of the invention, the zone having an interference effect is pale, that is to say at least partially not very visible at certain angles, especially by direct observation. The expression "direct observation" is understood to mean that the user holds the sheet substantially perpendicular to the direction of his gaze, that is to say facing him.

According to one embodiment of the invention, the sheet comprises several zones having an interference effect of pale colors.

According to one preferred embodiment of the invention, the zone having an interference effect comprises iridescent pigments as interference elements.

Preferably, said iridescent pigments are chosen from mother-of-pearl extracts, plastic pigments, pigments based on micas, optionally lead salts and mixtures thereof.

Suitable plastic pigments are, for example, those described in Patent Application WO 91/12146 and that are obtained by cutting a stack of plastic films such as two adjacent films which have different refractive indices.

In particular, said iridescent pigments are micas coated with at least one metal oxide, preferably a mica coated with titanium dioxide. For example, it is possible to use a mica coated with $TiO_2$ with, where appropriate, another metal oxide, such as those sold by Merck AG under the name Iriodin®.

Use is made, in particular, of an iridescent coating composition or ink comprising a binder, in particular that is transparent, chosen for its ease of handling and the durability that it gives to the binder/particle assembly once deposited, for example by screen printing or photogravure.

According to another embodiment of the invention, the zone having an interference effect comprises, as interference elements, pigments or a film comprising one or more dielectric layers positioned between one or more reflective metallic layers.

According to another embodiment of the invention, the zone having an interference effect comprises, as an interference element, a multi-layer polymer film, formed by an alternation of more or less intensely reflective layers.

According to another embodiment of the invention, the zone having an interference effect comprises, as interference elements, liquid crystals or pigments based on liquid crystals.

The latter substances having interference effects are described, for example, in Patent Application WO 01/60924.

According to one embodiment of the invention, the tactile recognition element creates a relief at the surface of the support.

According to one particular embodiment of the invention, the tactile recognition element comprises particles partially incorporated into said zone having an interference effect and/or into the support for the sheet. In this way, a security means having an interference effect is obtained, at the surface of which particles "stick out", that is to say form a relief at the surface of the security means, thus giving a tactile effect to said security means.

Preferably, said particles are solid.

According to another embodiment, said particles are hollow.

In particular, said particles have a spherical, pyramidal, ovoid, polyhedral or similar shape.

According to one particular embodiment, the size of the particles is between 5 and 100 μm, preferably between 10 and 60 μm.

According to one preferred embodiment, said particles are made of plastic, preferably polyester, polyethylene, polyamide, polypropylene or a mixture thereof.

According to another embodiment, said particles are made of metal, silica, glass or wax.

Generally, the person skilled in the art will choose a material that has a sufficient hardness and/or elasticity so that the particles are visible after the treatments that the sheet comprising the security means according to the invention will be made to undergo, especially a copperplate printing during which a high pressure, generally greater than $2\times10^7$ Pa (200 bar) is applied to the sheet. For example, particles that withstand copperplate printing well are particles of polyurethane having a diameter between 27 and 35 μm, sold by Daikin Chemical Europe, under the name Daiplacoat® RHC 230.

Moreover, a person skilled in the art will be able to choose the material as a function of the desired tactile effect, such as a smooth or rough feel.

According to one preferred example, a "rough" feel, that is to say for which the user perceives the reliefs in a particularly pronounced fashion, could be obtained by incorporating, into the zone having an interference effect, glass beads, such as those having a diameter of 20 μm sold by Sovitec under the name Microperl® 050-20-215.

According to another example, a "smooth" feel will be obtained by incorporating, at the surface of the zone having an interference effect, expandable thermoplastic microspheres such as those sold by Expancel under the name Expancel 820® and that have a size between 10 and 25 μm in the non-expanded state.

According to another example, a "granular and smooth" feel may be obtained by incorporating, at the surface of the zone having an interference effect, polyurethane microbeads having an average size approximately equal to 7 μm, such as those sold under the name Daiplacoat® RHU 5070 by Dainishiseika.

According to another embodiment, the tactile recognition element is a knitted structure placed in the bulk of the support, in particular a structure such as described in Application WO 2006/016088. For example, the tactile recognition element is a knitted structure composed of five strands made of metal and/or made of plastic, so as to form a full cardigan rib type knit fabric.

According to another embodiment of the invention, the tactile recognition element comprises at least one element with an interference effect that has several regions of different thicknesses so as to create a difference in tactile perception from one region to the other. In particular, when the zone having an interference effect comprises iridescent pigments as interference elements, the variation in thickness of said zone having an interference effect also makes it possible to create a variation in the interference effect, especially in the intensity of its coloring.

According to one embodiment of the invention, the tactile recognition element may be arranged so as to form a pattern. In particular, the tactile recognition element may be arranged so as to form at least one alphanumeric pattern, symbol or braille sign. For example, the tactile recognition element may be a structure composed of knitted strands so as to obtain rib fabrics having the shape of letters.

According to one particular case of the invention, the patterns of the tactile recognition element may be arranged so as to form a code, for example that can be read by a machine.

According to another embodiment of the invention, the tactile recognition element is a coating comprising a polymer used in the form of an aqueous dispersion and having a glass transition temperature preferably below 5° C., such as a polyurethane or a copolymer based on styrene-butadiene that gives a "rubbery" feel to the security means.

According to one embodiment of the invention, said tactile recognition element formed from a coating having a rubbery effect has the shape of an elongated strip, the width of which is between 0.4 and 4 cm, preferably between 0.5 and 2.5 cm.

Preferably, said coating having a rubbery effect and said zone having an interference effect overlap exactly.

According to one embodiment of the invention, the security means comprises at least two different tactile recognition elements. One such embodiment is particularly advantageous in that it makes it possible, by the contrast between the various feels, to further improve the ease of perceiving said security means. For example, the security means may comprise a strip having an interference effect comprising iridescent pigments and also two tactile recognition elements that are contiguous and are superposed on said strip having an interference effect, the strip with an interference effect alternately having a soft feel and a rough feel.

Generally, when the tactile recognition element is placed on the zone having an interference effect, the effect of the latter must not be hidden by the tactile recognition element.

According to one embodiment, the security means of the sheet according to the invention comprises at least one additional security element which makes it possible to further improve the level of security of the sheet. In particular, said additional security element is located exactly in the same zone as said zone having an interference effect and said tactile recognition element.

According to one embodiment, said additional security element may partially or completely cover the zone having an interference effect and/or the tactile recognition element without however the additional security element hiding the interference effect of the security means.

According to one embodiment of the invention, the additional security element may be thermochromic, piezochromic, luminescent, in particular fluorescent, or else magnetic, in the form for example of an ink or a coating of pigments. A person skilled in the art will chose the additional security means suited to the nature of the zone with an interference effect and of the tactile recognition element, so that said additional security means does not impair either the interference effect or the tactile effect of the security means.

According to one particular embodiment of the invention, the tactile recognition element comprises particles as described above, and said particles transport security elements in their bulk and/or at their surface such as luminescent pigments or markers.

According to another example, said particles are hollow and comprise in their center at least one security element such as a thermochromic, photochromic or fluorescent element.

According to one preferred embodiment, the additional security element is preferably an ink that is invisible under white light and visible only under UV, such as a fluorescent ink deposited on the zone having an interference effect.

According to one preferred embodiment of the invention, the sheet comprises at least one layer of fibrous material, especially based on cellulose fibers.

According to another embodiment, the support for the sheet comprises at least one layer of plastic material.

According to another embodiment of the invention, the sheet comprises both at least one layer of fibrous material and at least one layer of plastic material, optionally at least partially superposed. For example, the sheet may be made of a fibrous material, provided with an opening, so as to form a through window, said opening being covered by a layer of plastic material.

The invention also relates to a security document comprising the sheet described above. In particular, the invention relates to a means of payment such as a bank note, a check or a restaurant ticket, an identity document such as an identity card, a driving license, a passport page or a visa, a lottery ticket, a title deed, a transport ticket, a diploma or an entrance ticket to cultural or sporting events.

The invention also relates to an article to be authenticated based on paper or plastic requiring security protection, such as a security-protected label or a security-protected package, especially a package for medication or for foodstuffs or for cosmetics or fragrances or for electronic parts or for spare parts, a sheet used in the medical or hospital field, especially a paper used for making sterilization packages, a playing card or else an art paper.

The invention also relates to a method of authenticating a security document or an article to be authenticated as described above, that consists in touching said document or article to verify the presence of the security means by detecting the difference in tactile perception between said security means and the rest of the support and/or between the various tactile patterns, where appropriate, and in observing the interference effect of said security means. In this way, the man on the street can, on moving the document or the article, notice the color change of the security means.

Figure 2:
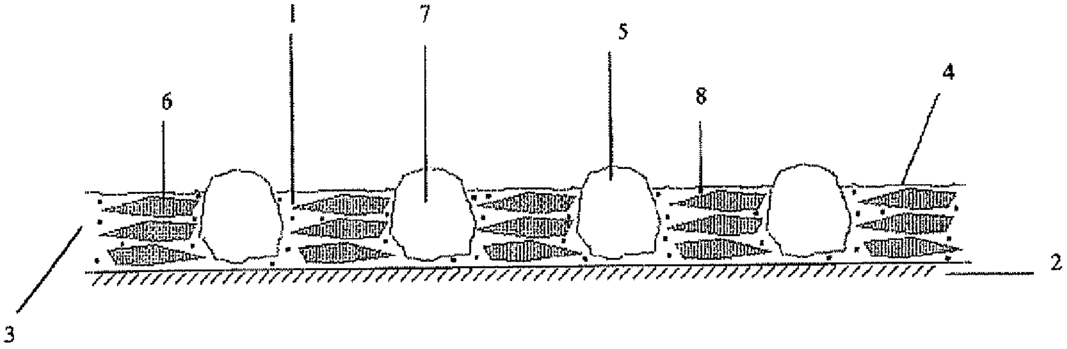

The invention will now be described in greater detail with the aid of the appended drawing in which:

FIG. 1 represents a cross-sectional view of a sheet according to one embodiment of the invention; and FIG. 2 represents a cross-sectional view of a sheet according to another embodiment of the invention.

FIG. 1 represents a cross-sectional view of a sheet (1) according to one embodiment of the invention. The sheet (1) comprises a support (2) made of a fibrous material, based on cellulose fibers, located on which is a security means composed of a zone having an interference effect and of a tactile recognition element. The zone having an interference effect comprises iridescent pigments (6) having a green/colorless interference effect (Iriodin 23®) composed of $TiO_2$-coated mica, transported in a binder chosen for its ease of handling and the durability that it gives to the binder/particle assembly once applied, for example a crosslinkable polyurethane. The tactile recognition element is composed of particles (7) of polypropylene having a more or less spherical shape, and having an average size of 30 μm, incorporated in the bulk of the zone having an interference effect. The assembly comprising the iridescent pigments (6) and also the polypropylene particles (7) may for example be deposited by means such as rotary screenprinting.

FIG. 2 represents a cross-sectional view of a sheet (1) according to another embodiment of the invention. The sheet (1) according to this embodiment has a structure similar to that of the sheet presented in FIG. 1, the security means additionally comprising fluorescent pigments (8) incorporated into the bulk of the zone having an interference effect.

Such an embodiment makes it possible to further improve the level of security of the sheet.

The man on the street will perceive, by touching the tactile zone, the zone having an interference effect and will see the green/colorless change of the latter depending on the angle of observation.

The invention claimed is:

1. A sheet comprising:

a support; and a security device, the security device comprising:

a first security element comprising at least one zone having an interference effect; and a second security element comprising at least one tactile recognition element located in the same region as said at least one zone having an interference effect, wherein the at least one tactile recognition element comprises particles dispersed within said at least one zone having an interference effect, the particles having a diameter ranging from 10 μm to 100 μm.

2. The sheet of claim 1, wherein said at least one zone having an interference effect is apparently at least partially invisible when viewed at certain angles.

3. The sheet of claim 2, wherein the certain angles includes 90 degrees.

4. The sheet of claim 2, wherein said security device comprises at least two zones that are at least partially invisible at certain angles, the two zones being contiguous or spaced apart.

5. The sheet of claim 1, wherein said at least one tactile recognition element and said at least one zone having an interference effect at least partially overlap.

6. The sheet of claim 1, wherein said tactile recognition element and said at least one zone having an interference effect completely overlap.

7. The sheet of claim 1, wherein said tactile recognition element is positioned at a surface of said zone having an interference effect, and/or is at least partially incorporated into substantially all of said zone having an interference effect, and/or is at the surface of said support, and/or at least partially incorporated into substantially all of said support.

8. The sheet of claim 1, wherein said zone having an interference effect and/or the tactile recognition element is in the form of a continuous strip or pattern.

9. The sheet of claim 8, wherein said strip has a width between 0.5 and 4 cm.

10. The sheet of claim 8, wherein said pattern has a fine structure, having a width of less than 0.4 mm.

11. The sheet of claim 8, wherein said pattern forms a code.

12. The sheet of claim 11, wherein the code can be read by a machine.

13. The sheet of claim 1, wherein said security device has missing material.

14. The sheet of claim 13, wherein the missing material comprises at least one of an alphanumeric pattern, a design, and a symbol.

15. The sheet of claim 1, wherein said zone having an interference effect comprises, as interference elements, iridescent pigments, plastic pigments, and pigments based on micas and mixtures thereof.

16. The sheet of claim 15, wherein the iridescent pigments comprise mother-of-pearl extracts.

17. The sheet of claim 15, wherein said iridescent pigments comprise micas coated with at least one metal oxide.

18. The sheet of claim 17, wherein the metal oxide comprises a mica coated with titanium dioxide.

19. The sheet of claim 1, wherein said zone having an interference effect comprises, as interference elements, pigments based on liquid crystals.

20. The sheet of claim 1, wherein said zone having an interference effect comprises, as interference elements, pigments or a film comprising one or more dielectric layers positioned between one or more reflective metallic layers.

21. The sheet of claim 1, wherein the tactile recognition element forms a relief at a surface of the support.

22. The sheet of claim 1, wherein said particles have a spherical, pyramidal, ovoid, or polyhedral shape.

23. The sheet of claim 22, wherein the diameter of said particles ranges from 10 μm to 60 μm.

24. The sheet of claim 1, wherein said particles are made of a plastic material.

25. The sheet of claim 24, wherein said particles comprise at least one of polyester, polyethylene, polyamide, and polypropylene.

26. The sheet of claim 1, wherein said particles comprise at least one of glass, metal, silica, and wax.

27. The sheet of claim 1, wherein the tactile recognition element comprises a knitted structure.

28. The sheet of claim 1, wherein the tactile recognition element comprises at least one interference element of variable thickness.

29. The sheet of claim 1, wherein said security device comprises at least two tactile recognition elements having different tactile effects.

30. The sheet of claim 1, wherein the security device is equipped with a third security element.

31. The sheet of claim 30, wherein said third security element is at least one of thermochromic, piezochromic, magnetic, and luminescent.

32. The sheet of claim 30, wherein said third security element is fluorescent.

33. The sheet of claim 1, wherein the support comprises at least one layer of fibrous material.

34. The sheet of claim 33, wherein the fibrous material is based on at least one of cellulose fibers and plastic material.

35. A security document, wherein the security document comprises a sheet as claimed in claim 1.

36. The security document of claim 35, wherein said security document is at least one of a means of payment, an identity document, a lottery ticket, a title deed, a transport ticket, a diploma, or an entrance ticket to an event.

37. The security document of claim 36, wherein the security document is a bank note, a check, or a restaurant ticket.

38. The security document of claim 36, wherein the security document is an identity card, a driving license, a passport page, or a visa.

39. An article to be authenticated, comprising a sheet as claimed in claim 1.

40. The article to be authenticated of claim 39, wherein said article is a security-protected label or a security-protected package.

41. The article to be authenticated of claim 40, wherein the article is at least one of a package for medication, a package for foodstuffs, a package for cosmetics, a package for fragrances, a package for electronic parts, a package for spare parts, a sheet used in the medical or hospital field, a playing card, and an art paper.

42. The article to be authenticated of claim 41, wherein the article is paper used for making sterilization packages.

43. A method for authenticating the article to be authenticated of claim 39, comprising:

contacting the article to be authenticated;

verifying, via contacting, the presence of the security device, wherein the verifying comprises detecting a difference in tactile perception between said security device and a remainder of the support and/or between one or more tactile patterns, and detecting the interference effect of said security device.

44. The sheet according to claim 1, wherein the particles are randomly dispersed.

45. The sheet according to claim 1, wherein the particles are beads.

46. A sheet comprising:

a support made of a fibrous material based on cellulose fibers;

a security device located on said support, the security device comprising:

a first security element comprising at least one zone having an interference effect; and a second security element comprising at least one tactile recognition element located in the same region as said at least one zone having an interference effect, wherein the at least one tactile recognition element comprises dispersed particles partially incorporated into said at least one zone having an interference effect, the dispersed particles being made of a plastic material or comprising at least one of glass, metal, silica, and wax.

47. A method for authenticating an article wherein the article comprises a sheet comprising:

a support; and a security device, the security device comprising:

a first security element comprising at least one zone having an interference effect; and a second security element comprising at least one tactile recognition element located in the same region as said at least one zone having an interference effect, the method comprising:

contacting the article to be authenticated;

verifying, via contacting, the presence of the security device, wherein the verifying comprises detecting a difference in tactile perception between said security device and a remainder of the support and/or between one or more tactile patterns, and detecting the interference effect of said security device.

* * * * *